US012792135B2

(12) United States Patent
Kozuki et al.

(10) Patent No.: US 12,792,135 B2
(45) Date of Patent: Nov. 10, 2026

(54) INPUT FOR MASSIVELY INTERACTIVE DISPLAYS

(71) Applicant: Sony Interactive Entertainment Inc., Tokyo (JP)

(72) Inventors: Todd Kozuki, San Mateo, CA (US); Oliver Capio, San Mateo, CA (US); Jason Wang, San Mateo, CA (US); Masanori Omote, San Mateo, CA (US); Manoj Srivastava, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/926,088

(22) Filed: Oct. 24, 2024

(65) Prior Publication Data

US 2026/0118947 A1 Apr. 30, 2026

(51) Int. Cl.

*G06F 3/01* (2006.01)
*A63F 13/27* (2014.01)
*G06F 3/0346* (2013.01)

(52) U.S. Cl.

CPC .............. *G06F 3/011* (2013.01); *A63F 13/27* (2014.09); *G06F 3/016* (2013.01); *G06F 3/0346* (2013.01)

(58) Field of Classification Search

CPC ........ G06F 3/011; G06F 3/016; G06F 3/0346; A63F 13/27

See application file for complete search history.

(56) References Cited

U.S. PATENT DOCUMENTS 6,766,036 B1 * 7/2004 Pryor ........................ G06T 7/73 348/169
7,244,180 B2 * 7/2007 McHugh .................. G09B 7/02 463/40
10,289,193 B2 * 5/2019 Hardy ..................... G06F 3/011
10,484,824 B1 * 11/2019 Gaeta ..................... H04B 1/385
10,621,784 B2 * 4/2020 Khan ...................... A63F 13/86
11,260,295 B2 * 3/2022 Mueller .................. A63F 13/77
11,351,453 B2 * 6/2022 Timm ..................... A63F 13/26
2002/0180728 A1 * 12/2002 Neff ....................... G03B 21/56 345/419
2003/0144017 A1 * 7/2003 Inselberg ................ A63F 13/12 455/517
2004/0085334 A1 * 5/2004 Reaney ................. A63F 13/424 704/E21.02
2006/0205512 A1 * 9/2006 Watanabe ............... A63F 13/12 463/42
2006/0258457 A1 * 11/2006 Brigham ............... A63F 13/843 463/36
2007/0111774 A1 * 5/2007 Okada ..................... A63F 13/27 463/16
2008/0214273 A1 * 9/2008 Snoddy ............... G07F 17/3276 463/19
2012/0331387 A1 * 12/2012 Lemmey .......... H04N 21/44218 715/781

(Continued)

*Primary Examiner* — Benyam Ketema
(74) *Attorney, Agent, or Firm* — Kilpatrick Townsend & Stockton LLP

(57) ABSTRACT

Techniques are provided for enabling sections of an audience viewing a massive display to interact with the display via one or more sensors associated with each spectator location, such as a seat. Machine learning may be used to fuse sensor signals into group-based control signals to interact with video being presented on the display.

20 Claims, 6 Drawing Sheets

(56) References Cited

U.S. PATENT DOCUMENTS

| | | | | |
|---|---|---|---|---|
| 2015/0143252 | A1* | 5/2015 | Longfellow | A63F 13/27 715/744 |
| 2016/0279509 | A1* | 9/2016 | Miller | A63F 13/26 |
| 2016/0346684 | A1* | 12/2016 | Edelman | A63F 13/27 |
| 2017/0246534 | A1* | 8/2017 | Johnson | A63F 13/98 |
| 2018/0292890 | A1* | 10/2018 | Swanson | G06F 3/0346 |
| 2019/0102939 | A1* | 4/2019 | He | A63F 13/65 |
| 2019/0104235 | A1* | 4/2019 | Sarkar | H04N 21/816 |
| 2019/0105568 | A1* | 4/2019 | Platt | A63F 13/52 |
| 2020/0360803 | A1* | 11/2020 | Collins | G06F 3/011 |
| 2020/0404344 | A1* | 12/2020 | Bathory | H04N 21/2187 |
| 2021/0337284 | A1* | 10/2021 | Person | H04N 21/466 |
| 2022/0134225 | A1* | 5/2022 | Omote | A63F 13/215 463/31 |
| 2022/0258044 | A1* | 8/2022 | Magpuri | A63F 13/847 |
| 2022/0339536 | A1* | 10/2022 | Dobrikov | A63F 13/217 |
| 2023/0083302 | A1* | 3/2023 | Benedetto | G06V 20/20 |
| 2023/0256332 | A1* | 8/2023 | Benedetto | A63F 13/27 463/31 |
| 2025/0196001 | A1* | 6/2025 | Taylor | A63F 13/52 |
| 2025/0246023 | A1* | 7/2025 | Jordan | G06V 40/10 |
| 2025/0360402 | A1* | 11/2025 | Osman | A63F 13/358 |
| 2026/0115587 | A1* | 4/2026 | Lobo | A63F 13/213 |

* cited by examiner

INPUT FOR MASSIVELY INTERACTIVE DISPLAYS

FIELD

The present application relates generally to input for massively interactive displays.

BACKGROUND

Video may be played on very large screens in stadiums and in special purpose venues.

SUMMARY

As understood herein, hundreds or thousands of people may view a massive display, and as further understood herein may enjoy viewing video on the display by making the video interactive with the audience.

Accordingly, an apparatus includes at least one processor system configured to receive signals from groups of plural sensors. Each group of plural sensors is associated with a respective spectator location in a display area. The processor system is configured to input the signals to at least one machine learning (ML) model, and present video on a large display at least in part based on output of the ML model.

In some examples each group of plural sensors can include two or more of a camera, a motion sensor, a pressure sensor, a microphone.

In non-limiting implementations the processor system may be configured to activate at least one haptic generator associated with at least one spectator location at least in part based on output of the ML model.

In some examples the processor system can be configured to present a video wave image on the large display at least in part based on output of the ML model. In other examples the processor system is configured to present a video image of a ball on the large display at least in part based on output of the ML model.

In certain embodiments the processor system can be configured to present a first video sequence on a first portion of the large display correlated to a first section in the display area at least in part based on signals from groups of sensors associated with the first section, and present a second video sequence on a second portion of the large display correlated to a second section in the display area at least in part based on signals from groups of sensors associated with the second section. The first video sequence can include a first team and the second video sequence can include a second team playing the first team.

In another aspect, an apparatus includes computer memory that is not a transitory signal and that in turn includes instructions executable by at least one processor system to present a video game on a large display with a generally hemispherical display surface, and control the video game based on signals from at first and second sensors associated with respective first and second locations of an area adjacent the display.

In another aspect, a method includes presenting video on a generally hemispherical display enclosing an area, and controlling the video based at least in part on signals received from sensors associated with respective seats in the area.

The details of the present application, both as to its structure and operation, can be best understood in reference to the accompanying drawings, in which like reference numerals refer to like parts, and in which:

DETAILED DESCRIPTION

Figure 1:
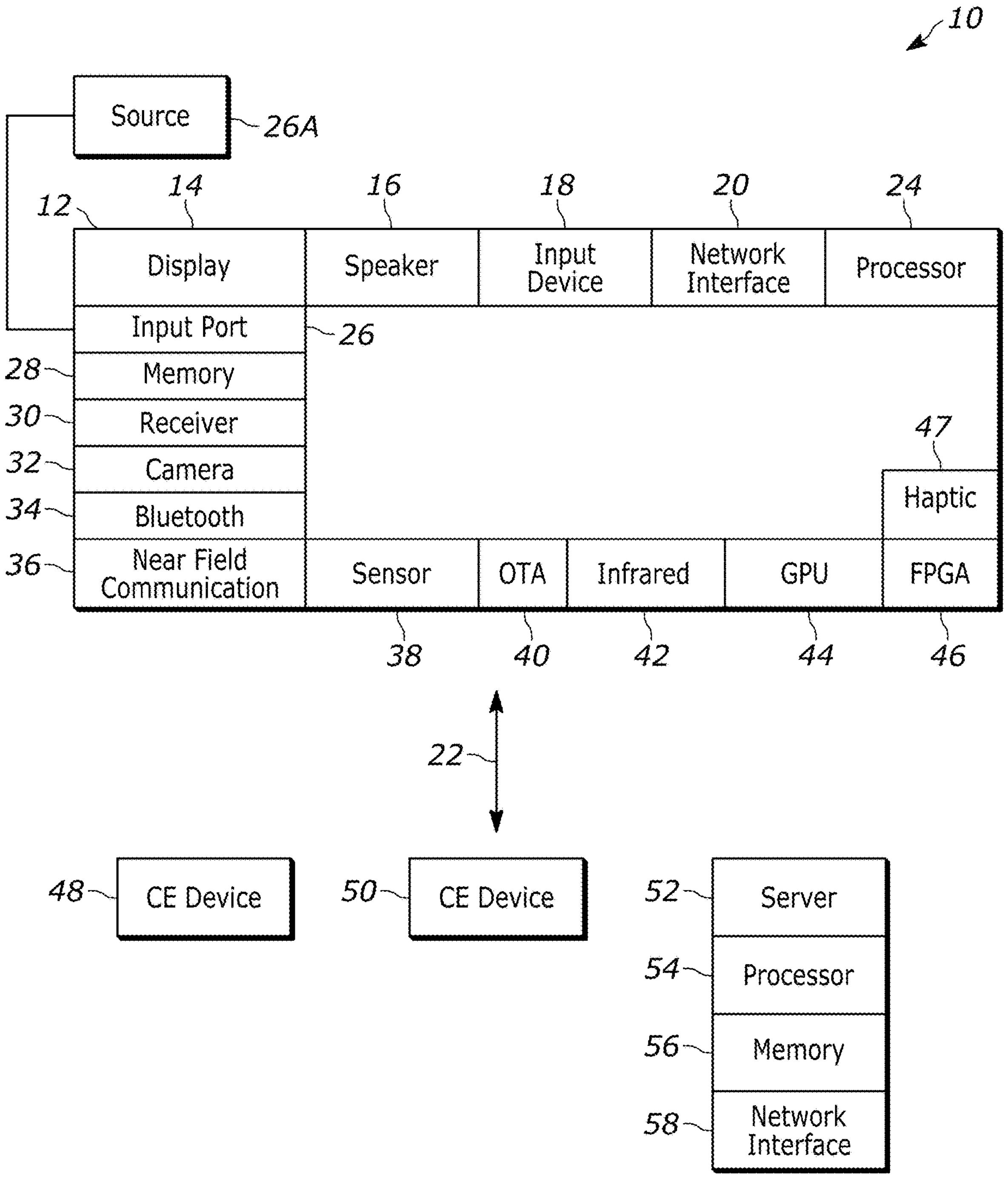
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single-or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that 8 typically includes a combination of accelerometers, gyroscopes, and magnetometers to determine the location and orientation of the AVD 12 in three dimension or by an event-based sensors such as event detection sensors (EDS).

An EDS consistent with the present disclosure provides an output that indicates a change in light intensity sensed by at least one pixel of a light sensing array. For example, if the light sensed by a pixel is decreasing, the output of the EDS may be-1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

9 In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine 11 learning may thus include an input layer, an output layer, and multiple hidden layers in between that are configured and weighted to make inferences about an appropriate output.

Figure 2:
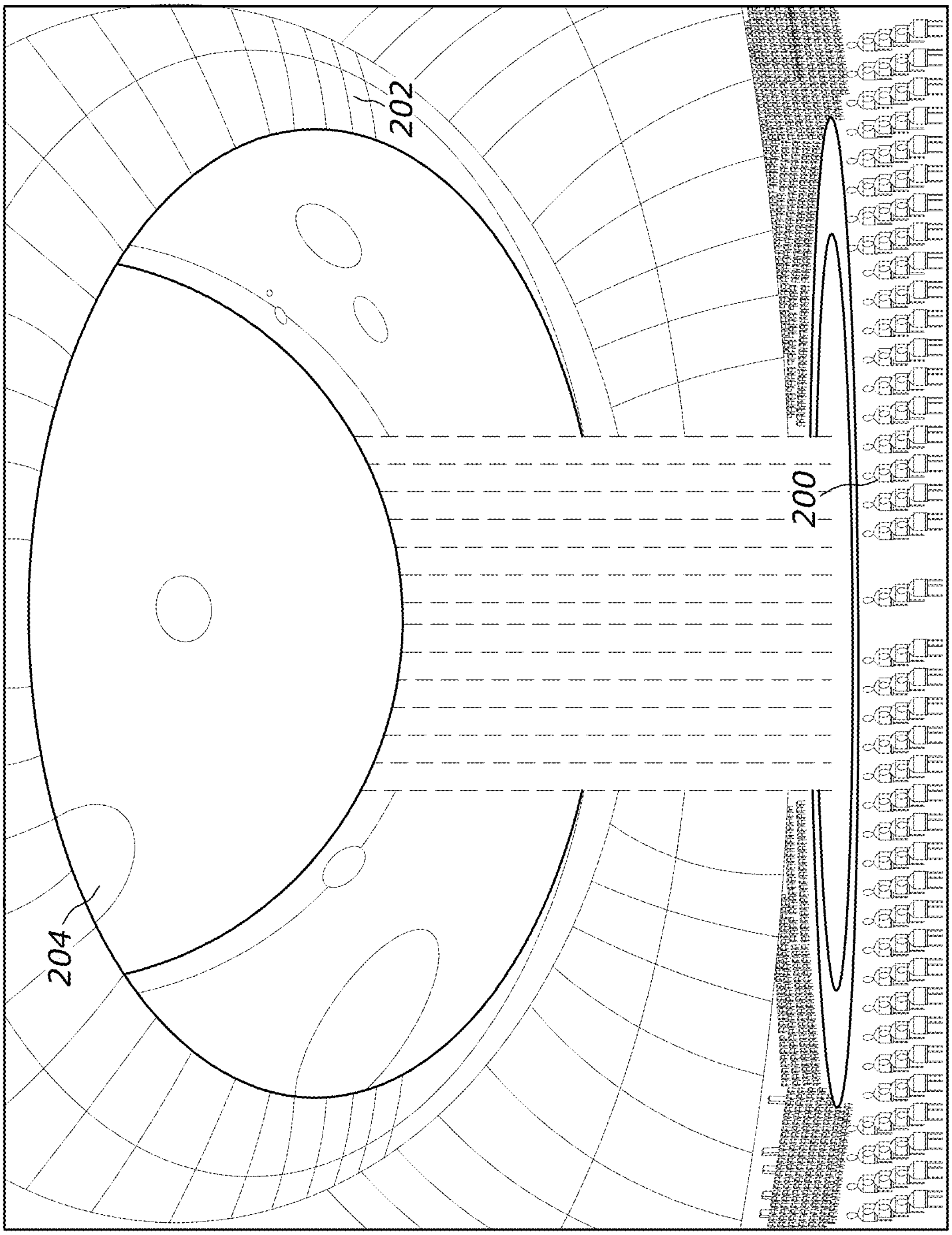
FIG. 2 illustrates a massive display configured as a sphere.

Refer now to FIG. 2. A large number of people are sitting or standing adjacent respective spectator locations such as respective seats 200 is a display area, in the example shown, a large arena-in-the-round. Overarching the display area is a massive video display 202, in the example shown, shaped as a hemisphere and presenting images 204, in the example shown, balls or planets. As set forth further below, some or all of the spectator locations such as seats 200 are associated with respective groups of plural sensors, the signals from which may be used to control or interact with the video being presented on the display 202.

Figure 3:
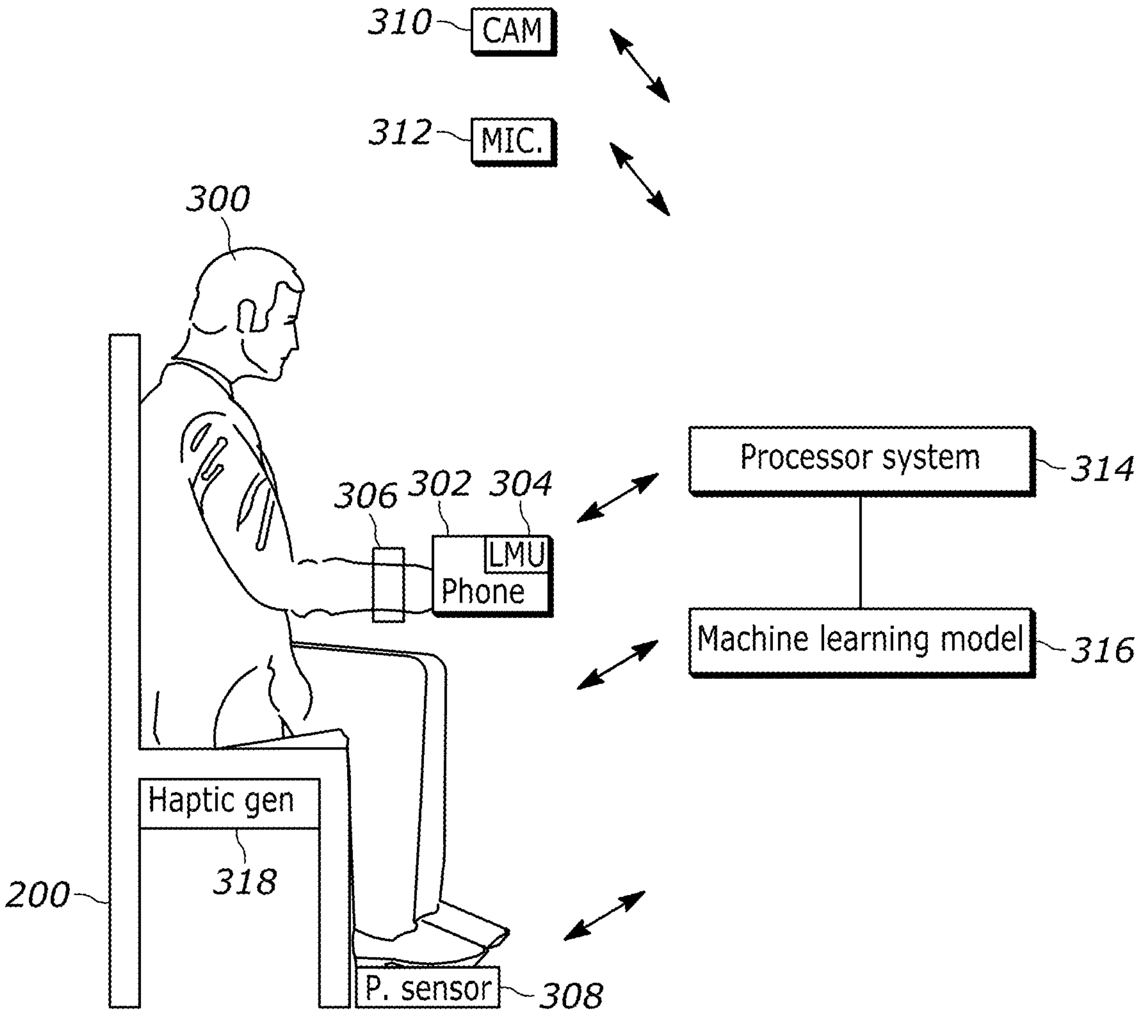
FIG. 3 illustrates, in block diagram form, various sensors and electronic components that can be associated with a seat in the sphere.

FIG. 3 illustrates one such seat 202. A person 300 may sit in the seat or stand adjacent the seat in the arena. The person 300 may wield a portable electronic device such as a phone 302 that may have one or more motion sensors 304 such as an inertial measurement unit (IMU), the output of which represents motion of the hand that wields it. Other motion sensors to sense motion of the person 300 may be used, e.g., accelerometers and/or gyroscopes, and the sensors may be mounted directly on the person such as via a wristband 306.

In addition to the motion sensor(s), the group of sensors associated with the seat 200 may include one or more pressure sensors 308. In the example shown, the pressure sensor 308 is mounted on the floor so that it can output signals representative of the person moving his feet by sliding, jumping, thumping, and the like. Other locations for the pressure sensor 308 may be used. For example, a pressure sensor may be disposed to sense when the person 300 is sitting in the seat and/or rising from the seat. Signals from the pressure sensors indicating people 12 jumping in concert with each other can be used to generate localized earthquakes by activating haptic generators in the floor and/or presenting images of tsunamis on the display 202.

Moreover, the group of sensors associated with the seat 200 may include one or more RGB or IR cameras 310 to capture images of the person 300 and one or more microphones 312 to capture vocal utterances of the person 300. When signals from the microphones indicate that a threshold vocal level in a first section of the arena is reached, a first portion of the display 202 may be activated, e.g., to flash on and off.

The sensors illustrated in FIG. 3 may include respective processors and wireless communication interfaces to communicate with a processor system 314 in the display area. The processor system 314 may execute one or more machine learning (ML) models 316, which receives data representing the signals from the sensors and outputs data indicating control signals for the interactive display 202 and, if desired, for one or more haptic generators 318 associated with the seat 200, located, in the example shown, to produce tactile signals on the horizontal surface of seat 200. Other haptic generator locations may be used, e.g., on the back of the seat, on the floor near the seat to simulate rumbling, etc.

Figure 4:
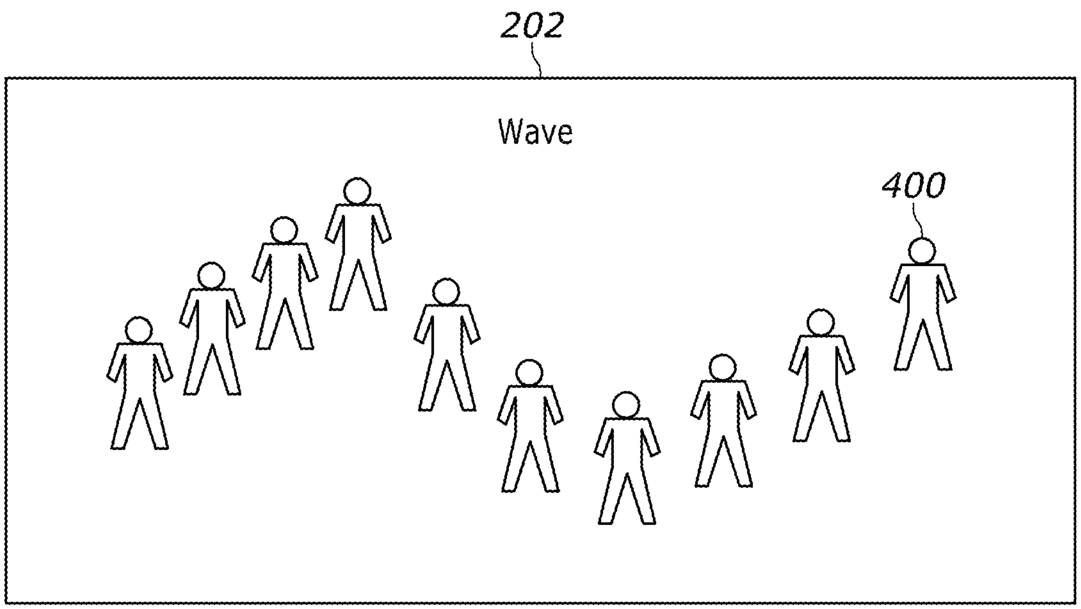
FIG. 4 illustrates an example presentation on a massive display such as the display shown in FIG. 2.

FIG. 4 illustrates an example video of images 400 of people doing a stadium wave based on output of the ML model. For example, people may stand up out of their seats in synchrony to perform a group wave motion, with their movements being detected by one or more pressure sensors, motions sensors, cameras. The signals from those sensors may be used by the processor system shown in FIG. 3 to construct a computer-generated image of the wave shown in FIG. 4.

Figure 5:
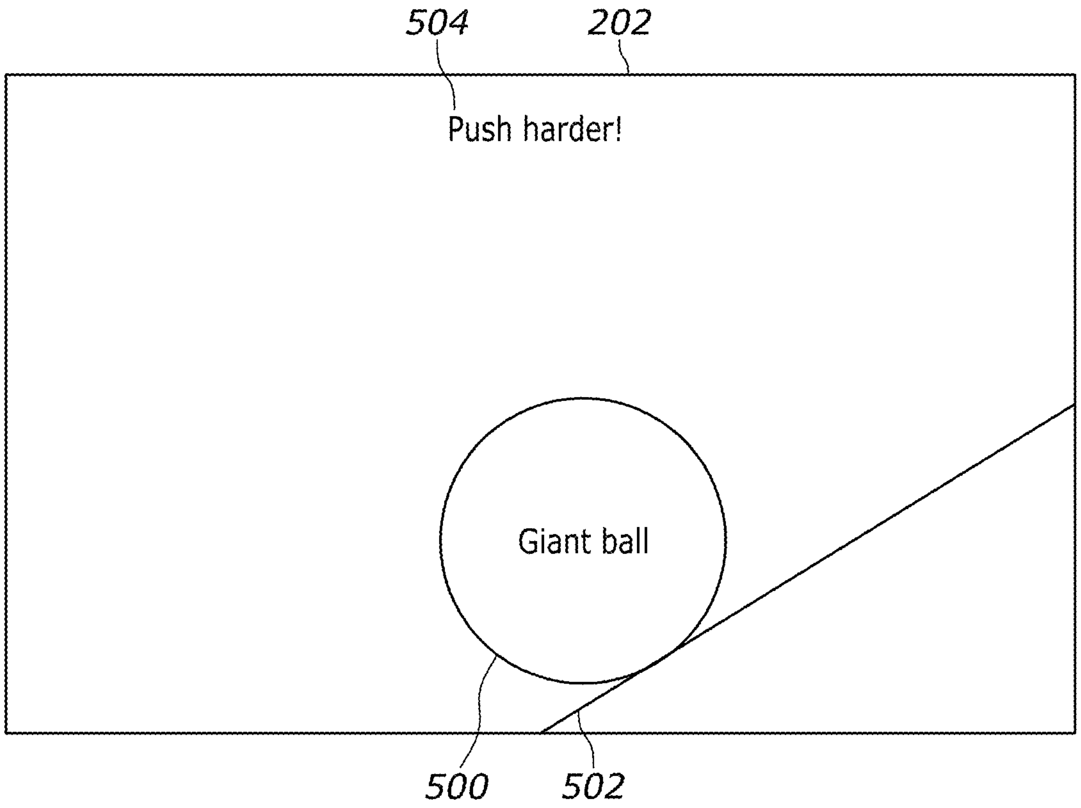
FIG. 5 illustrates another example presentation on a massive display such as the display shown in FIG. 2.

13 FIG. 5 illustrates an example video of an image 500 of a ball being "pushed" up an incline 502 based on output of the ML model. For example, people may extend their arms and/or lean forward in their seats and/or jump in response to an exhortation 504 on the display 202 to push the ball harder to move it up the incline 502. Movements of the people in the arena can be detected by one or more motions sensors, cameras, microphones (to pick up grunting noises or other sounds indicating effort). The signals from those sensors may be used by the processor system shown in FIG. 3 to construct a computer-generated image of the ball 500 being pushed up the incline 502.

Figure 6:
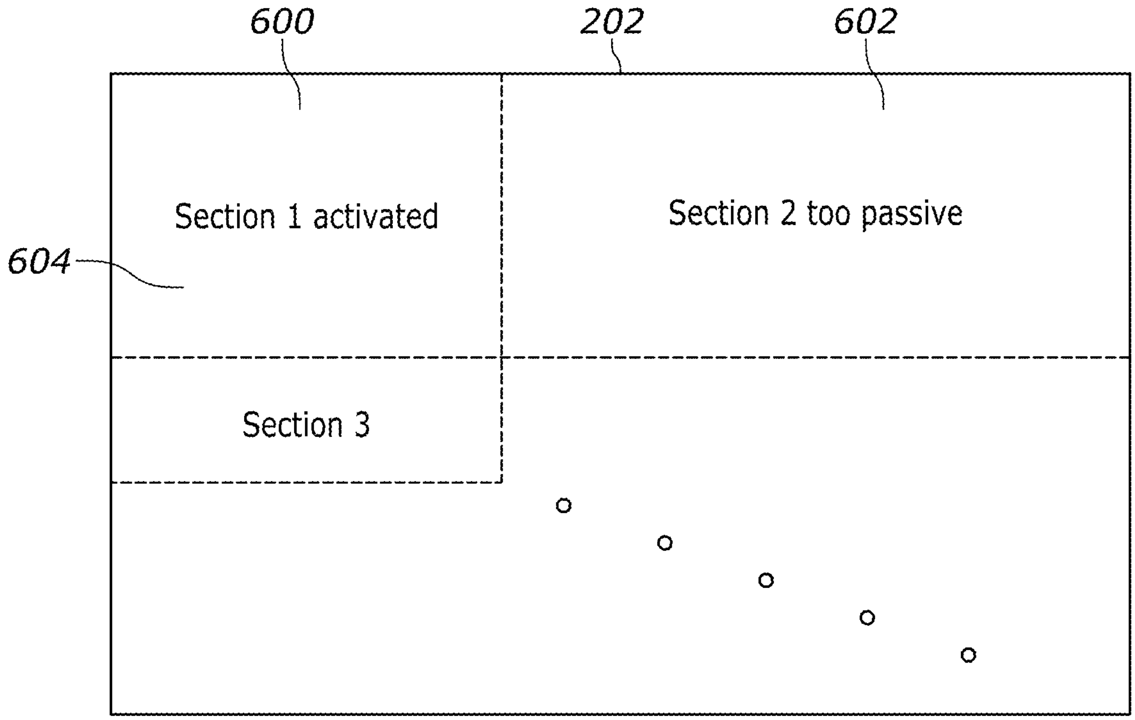
FIG. 6 illustrates another example presentation on a massive display such as the display shown in FIG. 2 in which portions of the display are segmented for control by respective sections of the audience.

FIG. 6 illustrates a partitioned video presentation on the display 202, in which a first video sequence is presented on a first portion 600 of the large display 202 for interaction with a first section in the display area based on signals from groups of sensors associated with the first section. Also, a second video sequence can be presented on a second portion 602 of the large display and correlated to a second section in the display area for control of the video in the second portion based on signals from groups of sensors associated with the second section. Additional portions of the display 202 may be correlated to additional sections in the arena. In this way, for example, the first video sequence can include a first team and the second video sequence can include a second team playing the first team, and the actions of the teams are defined by the signals from the groups of sensors in the respective arena sections. Advisories 604 also may be presented on the display indicating to the people in the respective sections whether they have correctly activated the video sequence in their respective display portion, whether they are being too passive, etc.

14

Figure 7:
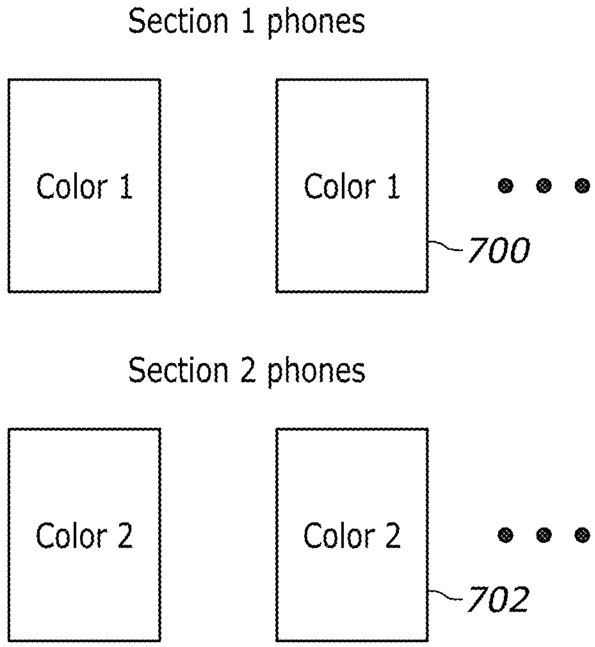
FIG. 7 illustrates plural cell phones in respective sections of the arena such as the configuration shown in FIG. 2.

Additional displays apart from the massive display 202 may be controlled based on signals from the seat-associated sensors. For example, in FIG. 7 the displays of phones 700 in a first section of the arena may be caused to present a first monochrome color responsive to, e.g., success of a team being controlled on the massive display 202 based on the sensor inputs from the first section. On the other hand, the displays of phones 702 in a second section of the arena may be caused to present a second monochrome color responsive to, e.g., failure of a team being controlled on the massive display 202 based on the sensor inputs from the second section.

Figure 8:
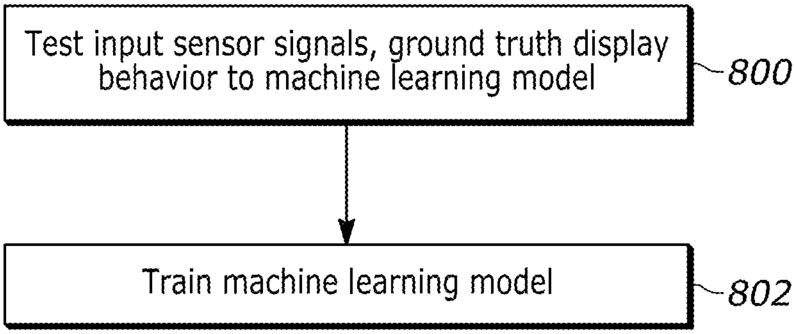
FIG. 8 illustrates example logic in example flow chart format for training a machine learning (ML) model to present images on a massive display according to sensor signal inputs from seats in an arena.

FIG. 8 illustrates an example technique for training the ML model(s) 316 in FIG. 3 to receive sensor signals from the groups of sensors of the seats in the arena and output video control signals in response. At state 800 a training set of data is input to the ML model to train the model at state 802. The training set may include, e.g., data representing various signals from the sensors intended to be used in the groups of sensors along with ground truth indication or annotation of display behavior to be associated with the sensor indications.

It is to be understood that the training data may represent sensor signals from a large number of seats in an arena or display area. The sensor signals may represent examples of concerted or synchronized user action along with ground truth display behavior to be obtained and examples of uncoordinated, random user action along with ground truth display behavior to be obtained therefrom.

Figure 9:
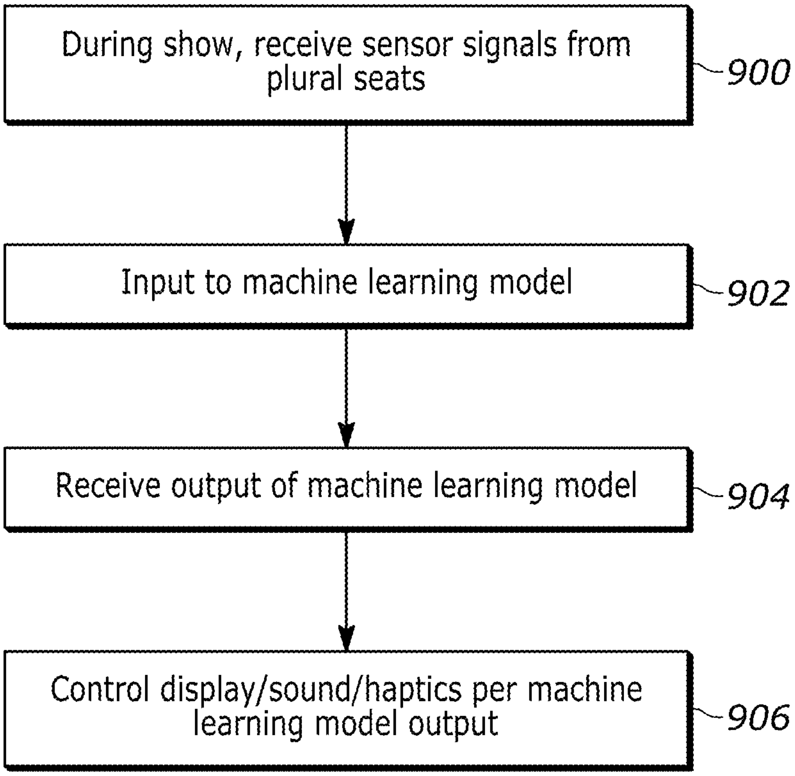
FIG. 9 illustrates example logic in example flow chart format for using the ML model trained according to FIG. 8 to present images on a massive display.

Turn now to FIG. 9 for an example technique for using the ML model once trained. Commencing at state 900, during an event that includes video presentation on the massive display 202, sensor signals from some or all of the occupied seats in the display area are received. Moving to state 902, data representing the sensor signals is input to the ML model.

Proceeding to state 904, the output of the ML model is received responsive to the input data. The output of the model represents video control signals to control/interact with the video being presented on the display 202. The video is duly controlled at state 906 according to the output of the ML model, if desired on a display portion basis as described herein.

Note that in an all-standing event, the team assignment of sensors may be using respective colors of wristbands worn by spectator/participants to define respective teams, or using one or more digits of the serial number of the spectator/participants, or using one or more letters of the spectator/participants registered names for the event (e.g., on the ticket.)

While the particular embodiments are herein shown and described in detail, it is to be understood that the subject matter which is encompassed by the present invention is limited only by the claims.

What is claimed is:

1. An apparatus comprising:

at least one processor system; and memory storing executable instructions that, when executed by the at least one processor system, cause the at least one processor system to at least:

receive signals from groups of plural sensors, each group of plural sensors being integrated with a respective spectator location in a display area;

input the signals to at least one machine learning (ML) model to identify a synchronized user action of users associated with the groups of plural sensors based at least in part on the signals from the groups of plural sensors;

produce a computer-generated image representing the synchronized user action; and present a video comprising the computer-generated image on a display.

2. The apparatus of claim 1, wherein each group of plural sensors comprises two or more of a camera, a motion sensor, a pressure sensor, and a microphone.

3. The apparatus of claim 1, wherein the executable instructions further cause the at least one processor system to:

activate at least one haptic generator associated with at least one seat at least in part based on the synchronized user action.

4. The apparatus of claim 1, wherein the executable instructions further cause the at least one processor system to:

present a video wave image on the display at least in part based on the synchronized user action.

5. The apparatus of claim 1, wherein the executable instructions further cause the at least one processor system to:

present a video image of a ball on the display at least in part based on the synchronized user action.

6. The apparatus of claim 1, wherein the video comprises a first video sequence presented on a first portion of the display, the first video sequence comprising a representation of a first synchronized user action of users associated with the groups of plural sensors of a first section in the display area, and, and a second video sequence presented on a second portion of the display, the second video sequence comprising a representation of a second synchronized user action of users associated the groups of plural sensors of a second section in the display area.

7. The apparatus of claim 6, wherein the first video sequence comprises a first team and the second video sequence comprises a second team playing the first team.

8. An apparatus comprising:

one or more processors; and non-transitory computer memory storing executable instructions that, when executed by the one or more processors, cause the one or more processors to at least:

present a video game on a display; and control the video game based on signals from a first group of sensors integrated with a first location and a second group of sensor integrated with a second location, the first location and the second location being located within an area adjacent the display;

input the signals from the first group of sensors and the second group of sensors to one or more machine learning (ML) models to identify a first synchronized user action associated with the first group of sensors and a second synchronized user action associated with the second group of sensors based at least in part on the signals;

produce a first computer-generated image representing the first synchronized user action;

produce a second computer-generated image representing the second synchronized user action;

modify the video game to include one or more of the first computer-generated image and the second computer-generated image; and activate one or more haptic generator associated with one or more of the first group of sensors and the second group of sensors based on one or more of the first synchronized user action and the second synchronized user action;.

9. The apparatus of claim 8, wherein the first location comprises a first group of seats and the second location comprises a second group of seats in the area adjacent to the display.

10. The apparatus of claim 9, wherein each first and second groups of sensors comprises two or more of a camera, a motion sensor, a pressure sensor, and a microphone.

11. The apparatus of claim 8, wherein the executable instructions further cause the one or more processors to:

present a video wave image on the display at least in part based on one or more of the first synchronized user action and the second synchronized user action.

12. The apparatus of claim 8, wherein the executable instructions further cause the one or more processors to:

present a video image of a ball on the display at least in part based on one or more of the first synchronized user action and the second synchronized user action.

13. The apparatus of claim 8, wherein the executable instructions further cause the one or more processors to present a video as part of the video game, the video comprising:

a first video sequence presented on a first portion of the display, the first video sequence representing the first synchronized user action; and a second video sequence presented on a second portion of the display, the second video sequence representing the second synchronized user action.

14. The apparatus of claim 13, wherein the first video sequence comprises a first team and the second video sequence comprises a second team playing the first team.

15. A method, comprising:

presenting a video on a display enclosing an area;

controlling the video based at least in part on signals received from one or more sensors integrated with respective spectator locations in the area;

inputting data representing the signals to at least one machine learning (ML) model to identify a synchronized user action of users associated with the sensors integrated with respective spectator locations in the area; and controlling the display based on the synchronized user action.

16. The method of claim 15, wherein the one or more sensors comprises two or more of a camera, a motion sensor, a pressure sensor, and a microphone integrated with each one of the respective spectator locations.

17. The method of claim 15, wherein controlling the video comprises:

producing a computer-generated image representing the synchronized user action; and including the computer-generated image as part of the video presented at the display.

18. The method of claim 17, wherein:

producing the computer-generated image comprises:

constructing a first video sequence comprising a representation of a first synchronized user action of users associated with the one or more sensors of a first section in the area, and constructing a second video sequence comprising a representation of a second synchronized user action of users associated with the one or more sensors of a second section in the area; and including the computer-generated image comprises providing the first video sequence and the second video sequence as at least a portion of the video to be presented at the display.

19. The method of claim 15, further comprising:
activating one or more haptic generators integrated with the respective spectator locations in the area, based at least in part on the synchronized user action.

20. The apparatus of claim 2, wherein the pressure sensor is mounted on a floor of the respective spectator location.

* * * * *